(12) United States Patent
Boland

(10) Patent No.: US 9,199,612 B2
(45) Date of Patent: Dec. 1, 2015

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 246 days.

(21) Appl. No.: 13/810,012

(22) PCT Filed: Jul. 12, 2010

(86) PCT No.: PCT/EP2010/059968
§ 371 (c)(1),
(2), (4) Date: Jan. 14, 2013

(87) PCT Pub. No.: WO2012/007028
PCT Pub. Date: Jan. 19, 2012

(65) Prior Publication Data
US 2013/0111692 A1    May 9, 2013

(51) Int. Cl.
*B60S 1/38* (2006.01)
*B60S 1/04* (2006.01)
*B60S 1/40* (2006.01)

(52) U.S. Cl.
CPC .............. *B60S 1/0413* (2013.01); *B60S 1/386* (2013.01); *B60S 1/3808* (2013.01); *B60S 1/3806* (2013.01); *B60S 1/387* (2013.01); *B60S 1/3848* (2013.01); *B60S 1/3874* (2013.01); *B60S 1/407* (2013.01); *B60S 2001/4054* (2013.01)

(58) Field of Classification Search
CPC ...... B60S 1/386; B60S 1/0413; B60S 1/3806; B60S 1/3848
USPC .......................... 15/250.201, 250.203, 250.32
See application file for complete search history.

(56) References Cited

U.S. PATENT DOCUMENTS

| 7,523,522 | B2 * | 4/2009 | Herring et al. | 15/250.32 |
| 8,220,105 | B2 * | 7/2012 | Jarasson et al. | 15/250.32 |
| 8,438,692 | B2 * | 5/2013 | Ollier | 15/250.32 |
| 8,839,482 | B2 * | 9/2014 | Kim et al. | 15/250.32 |
| 2008/0028565 | A1 * | 2/2008 | Thienard | 15/250.201 |
| 2008/0295272 | A1 * | 12/2008 | Jarasson | 15/250.32 |
| 2009/0007364 | A1 * | 1/2009 | Jarasson et al. | 15/250.32 |
| 2009/0056049 | A1 * | 3/2009 | Jarasson et al. | 15/250.32 |
| 2010/0005609 | A1 | 1/2010 | Kim | |

(Continued)

FOREIGN PATENT DOCUMENTS

| EP | 2177407 A1 | 4/2010 |
| FR | 2847869 A1 | 6/2004 |

(Continued)

OTHER PUBLICATIONS

Egner-Walter et al., Flat Wiper Blade, WO2009000498—Jan. 2015 (English Translation).*

*Primary Examiner* — Monica Carter
*Assistant Examiner* — Michael Jennings
(74) *Attorney, Agent, or Firm* — Robert L. Stearns; Dickinson Wright, PLLC

(57) ABSTRACT

A windscreen wiper device, includes an elongated wiper blade of flexible material which includes one groove, in which groove a strip is disposed, wherein said windscreen wiper device includes a connecting device for connecting said wiper blade to an oscillating arm and wherein said wiper blade includes a spoiler, said connecting device includes connecting parts, wherein said spoiler is sandwiched between said connecting parts when said connecting parts are connected to each other.

11 Claims, 4 Drawing Sheets

(56) References Cited

U.S. PATENT DOCUMENTS

2010/0050361 A1* 3/2010 Chang et al. ............... 15/250.32
2010/0139026 A1* 6/2010 Ku ............................. 15/250.201

FOREIGN PATENT DOCUMENTS

FR            2854852 A1    11/2004
WO    WO 2009000498 A1 * 12/2008

* cited by examiner

WINDSCREEN WIPER DEVICE

BACKGROUND OF THE INVENTION

1. Technical Field

The present invention relates to a windscreen wiper device, particularly for automobiles, comprising an elastic, elongated carrier element, as well as an elongated wiper blade of a flexible material, which can be placed in abutment with a windscreen to be wiped, which wiper blade is of the flat blade type and includes at least one groove, in which groove a longitudinal strip of the carrier element is disposed, wherein the windscreen wiper device comprises a mounting head for transferring a reciprocal movement to an oscillating arm, wherein the windscreen wiper device further comprises a connecting device for detachably connecting the wiper blade to the oscillating arm near one end thereof around a pivot axis, and wherein the wiper blade comprises a spoiler at a side thereof facing away from a windscreen to be wiped.

2. Related Art

The invention also refers to a wiper blade to be used in such a windscreen wiper device.

Such a windscreen wiper device and such a wiper blade are generally known. This prior art wiper blade is designed as a so-called "flat blade" or "yokeless blade", wherein no use is made of several yokes pivotally connected to each other, but wherein the wiper blade is biased by the carrier element, as a result of which it exhibits a specific curvature. In practice the wiper blade often comprises a spoiler at a side thereof facing away from the windscreen to be wiped. The spoiler is also called an "air deflector".

The object of the invention is to provide an improved windscreen wiper device.

SUMMARY OF THE INVENTION

In order to accomplish that objective, a windscreen wiper device of the type referred to in the introduction is characterized according to the invention in that the connecting device comprises connecting parts formed as separate constructional elements, wherein the spoiler is sandwiched between the connecting parts when they are connected to each other, thereby allowing the connecting parts to engage the spoiler on opposite sides thereof in order to block any lateral movement between the longitudinal strip and the wiper blade at the location of their interconnection and between the connecting device and the wiper blade at the location of their interconnection. In use, during each oscillatory movement of the oscillatory arm, the wiper blade at the location outside the connection device would normally suffer from the so-called "fishtailing phenomenon", wherein the wiper blade on opposite sides of the connecting device vibrates in an uncontrollable manner parallel to a windscreen to be wiped. Obviously, this "fishtailing phenomenon" results in deteriorated wiping properties, with all negative consequences involved, particularly at high speeds.

According to the invention the connecting parts are clamped onto the flexible material of the wiper blade, wherein a controlled and predetermined pressure is applied by the connecting parts onto the spoiler sandwiched between them. Experimental results have shown that the "fishtailing phenomenon" is avoided at least to a large extend, so that the wiping properties are improved.

It is noted that the present invention is not restricted to the use of only one longitudinal strip forming the elastic carrier element that is particularly located in a central longitudinal groove of the wiper blade. Instead, the carrier element may also comprise two longitudinal strips, wherein the strips are disposed in opposite longitudinal grooves of the wiper blade. Further, the present invention is not restricted to automobiles, but also refers to other fast vehicles, such as trains and the like.

In a preferred embodiment of a windscreen wiper device in accordance with the invention the connecting parts are not mirror symmetrical with respect to a middle longitudinal plane of the connecting device, the plane extending perpendicular to a windscreen to be wiped. In other words, the asymmetric connecting parts follow an asymmetric shape of the spoiler, wherein the one connecting part (in use) facing away from a bonnet or hood of an automobile has a width corresponding to a longitudinal air deflecting side of the spoiler (in use) facing away from the bonnet, and wherein the other connecting part (in use) facing towards the bonnet has a width corresponding to a longitudinal non-air deflecting side of the spoiler facing towards the bonnet. Hence, a controlled and predetermined pressure can be applied by the connecting parts onto the spoiler sandwiched between them.

In another preferred embodiment of a windscreen wiper device according to the invention the connecting parts and the spoiler are provided with co-axial transverse through holes at the location of their interconnection, wherein the connecting parts and the spoiler are connected together by means of a pin extending through the through holes. the pin is preferable a screw, so that the connecting parts are screwed together.

In another preferred embodiment of a windscreen wiper device in accordance with the invention the connecting parts are provided with inwardly extending protrusions comprising the through holes, wherein a protrusion of the one connecting part extends inside a protrusion of the other connecting part. the protrusions thus function as guiding elements for correctly positioning the connecting parts relative to one another in order to interconnect them.

In another preferred embodiment of a windscreen wiper device according to the invention the connecting parts comprise legs having inwardly bent edges at their outer ends, the legs being connected to the flexible material of the wiper blade on opposite sides thereof, wherein the legs are provided with two pairs of opposite protrusions near the outer ends of the connecting device, and wherein the protrusions extend laterally inwardly for exerting only a transverse force on the flexible material of the wiper blade, thereby locally squeezing the flexible material onto the longitudinal strip, in order to block any lateral movement between the longitudinal strip and the wiper blade at the location of their interconnection.

Particularly, the ratio (1/L) between the width L' of the flexible material at the location of the protrusions and the width L of the flexible material at the location outside the protrusions varies between 30% and 1%.

According to the invention the protrusions extend laterally inwardly only from a vertical part of each leg for exerting only a transverse force on the flexible material of the wiper blade, thereby allowing the longitudinal strip to exhibit a curvature at the location of the interconnection of the connecting device and the wiper blade. Experimental results have shown that the "fishtailing phenomenon" is further avoided at least to a large extend, so that the wiping properties are improved. Preferably, the protrusions have a round cross-section.

In another preferred embodiment of a windscreen wiper device in accordance with the invention the oscillating arm is provided with an extension comprising a pivot pin being able to pivot around the pivot axis, as well as a L-shaped shoulder acting as securing means for securing the connecting device on the pivot pin, wherein the L-shaped shoulder projects out in the direction of the pivot pin and across the wiper blade and at the free end of which is disposed a leg facing the windscreen to be wiped, and wherein the connecting device comprises a transverse through hole for receiving the pivot pin. Accordingly, the wiper blade may then be connected to the oscillating arm on the basis of a so-called "sidelock system". The oscillating arm is provided with the pivot pin or joint pin to be inserted in the co-axial through holes. the pivot pin protrudes in a direction towards the wiper blade and has a pivot axis extending in a direction of the oscillating movement of the oscillating arm.

In another preferred embodiment of a windscreen wiper device according to the invention the connecting device is detachably connected to the oscillating arm with the interposition of a joint part, and wherein the joint part is detachably connected to the connecting device by engaging protrusions of the connecting device, at the location of the pivot axis, in recesses provided in the joint part. The protrusions preferably extend outwards on either side of the connecting device, whereas the joint part preferably comprises at least one resilient tongue engaging in a correspondingly shaped hole provided in a base of a U-shaped cross-section of the oscillating arm, and wherein the resilient tongue is rotatable along a hinge axis between an outward position retaining the wiper blade onto the oscillating arm and an inward position releasing the wiper blade from the oscillating arm. Accordingly, the wiper blade may then be connected to the oscillating arm on the basis of a so-called "toplock system" on the basis of a bayonet connection. In order to connect the wiper blade onto the oscillating arm, the resilient tongue is initially pushed in against a spring force—as if it were a push button—and then allowed to spring back into the hole provided in the oscillating arm, thus snapping, that is clipping the resilient tongue into the hole. By subsequently pushing in again the resilient tongue against the spring force, the wiper blade may be released from the oscillating arm.

A windscreen wiper device according to the invention comprises a mounting head fixed for rotation to a shaft, wherein the shaft is rotatable alternately in a clockwise and in a counter-clockwise sense carrying the mounting head into rotation. The oscillating arm is connected to the mounting head fixed for rotation to the shaft driven by a small motor. In use, the shaft rotates alternately in a clockwise and in a counter-clockwise sense carrying the mounting head into rotation also, which in turn draws the oscillating arm into rotation and by means of the connecting device moves the wiper blade. Further, a windscreen wiper device in accordance with the invention comprises a connecting piece positioned on both ends of the wiper blade and connected to an end of the longitudinal strip.

The present invention also relates to a wiper blade of the flat blade type including at least one groove, in which groove a longitudinal strip of a carrier element is disposed, the wiper blade comprising a connecting device detachably connected thereto for detachably connecting the wiper blade to an oscillating arm near one end thereof around a pivot axis, and wherein the wiper blade comprises a spoiler at a side thereof facing away from a windscreen to be wiped, characterized in that the connecting device comprising connecting parts formed as separate constructional elements, wherein the spoiler is sandwiched between the connecting parts when they are connected to each other, thereby allowing the connecting parts to engage the spoiler on opposite sides thereof in order to block any lateral movement between the longitudinal strip and the wiper blade at the location of their interconnection and between the connecting device and the wiper blade at the location of their interconnection.

THE DRAWINGS

The invention will now be explained more in detail with reference to figures illustrated in a drawing, wherein FIG. 1 is a perspective, schematic view of a preferred embodiment of a windscreen wiper device according to the invention, with and without (a part of) an oscillating arm, respectively;

DETAILED DESCRIPTION

Figure 1:
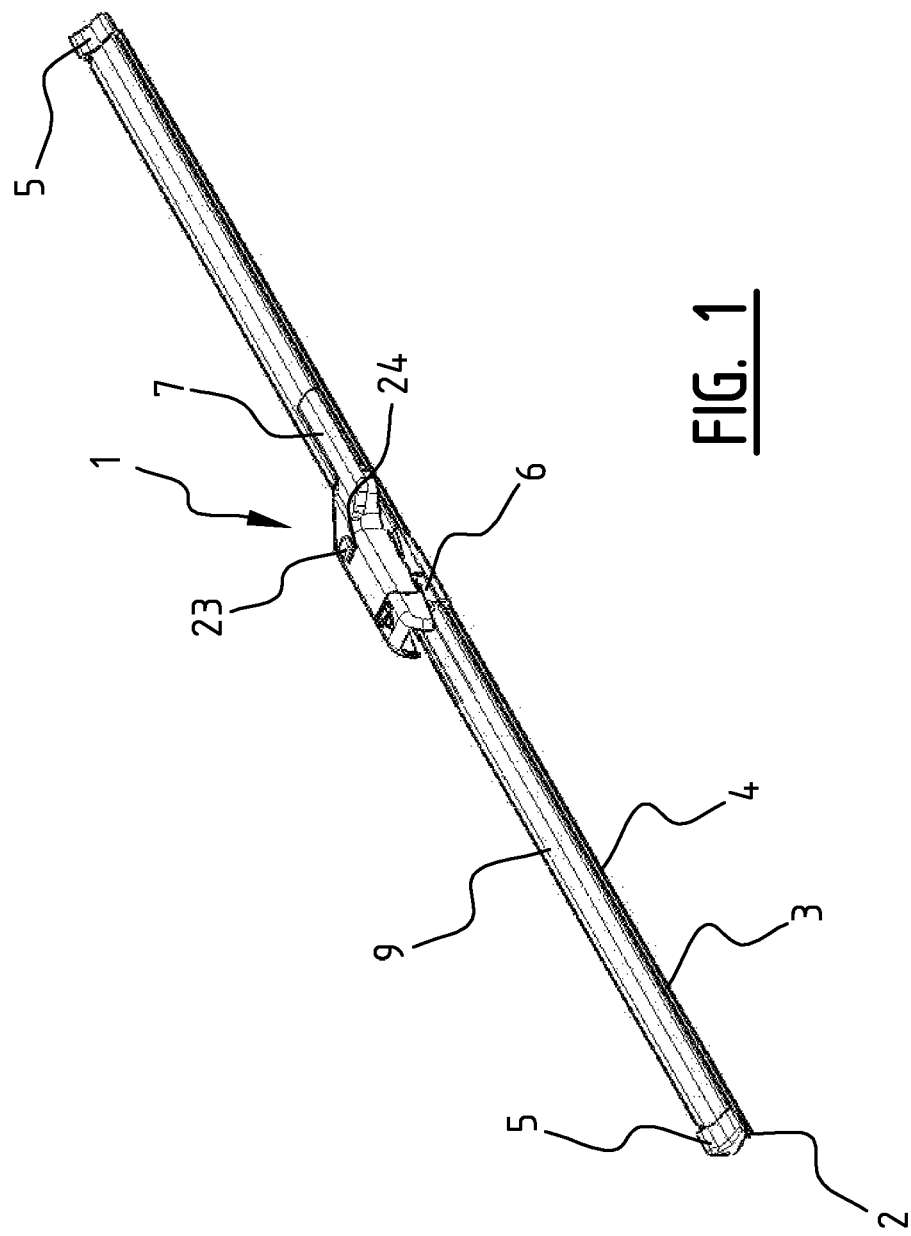

FIG. 1 shows a preferred variant of a windscreen wiper device 1 according to the invention. the windscreen wiper device is built up of an elastomeric (rubber) wiper blade 2 of the flat blade type comprising a central longitudinal groove 3, wherein a longitudinal strip 4 made of spring band steel is fitted in the longitudinal groove 3. The strip 4 forms a flexible carrier element for the rubber wiper blade 2, as it were, which is thus biased in a curved position (the curvature in operative position being that of a windscreen to be wiped). An end of the strip 4 and/or an end of the wiper blade 2 is connected on either side of the windscreen wiper device 1 to respective connecting pieces or "end caps" (5). The connecting pieces may be separate constructional elements, which may be form-locked as well as force-locked to both ends of the strip 4 and/or ends of the wiper blade 2. In another preferred variant, the connecting pieces may be in one piece with the strip 4 made of spring band steel. The windscreen wiper device 1 is furthermore built up of a connecting device 6 of metal for connecting an oscillating wiper arm 7 thereto, with the interposition of a joint part 8 (see FIG. 5). The oscillating wiper arm 7 is pivotally connected to the connecting device 6 about a pivot axis near one end. The preferred embodiment of FIG. 1 according to the invention comprises a spoiler or "air deflector" 9 which is made in one piece with the rubber wiper blade 2 and which extends along the entire length thereof.

Although not shown in FIG. 1, but fully understood by a skilled person, the oscillating arm 7 is connected to a mounting head fixed for rotation to a shaft driven by a small motor. In use, the shaft rotates alternately in a clockwise and in a counter-clockwise sense carrying the mounting head into rotation also, which in turn draws the oscillating arm 7 into rotation and by means of the connecting device 6 moves the wiper blade 2.

Figure 2:
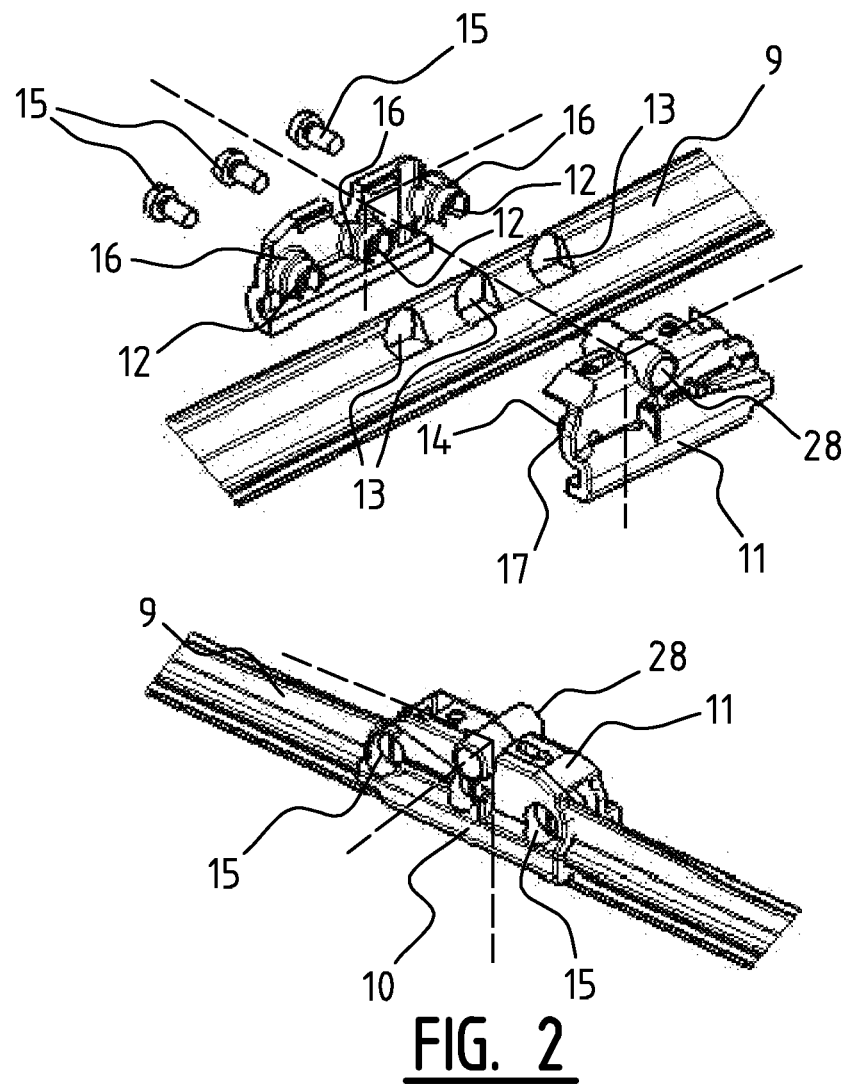
FIG. 2 is an exploded view and an assembled view of wiper blade and a connecting device, as used in a windscreen wiper device of FIG. 1.
Figure 3:
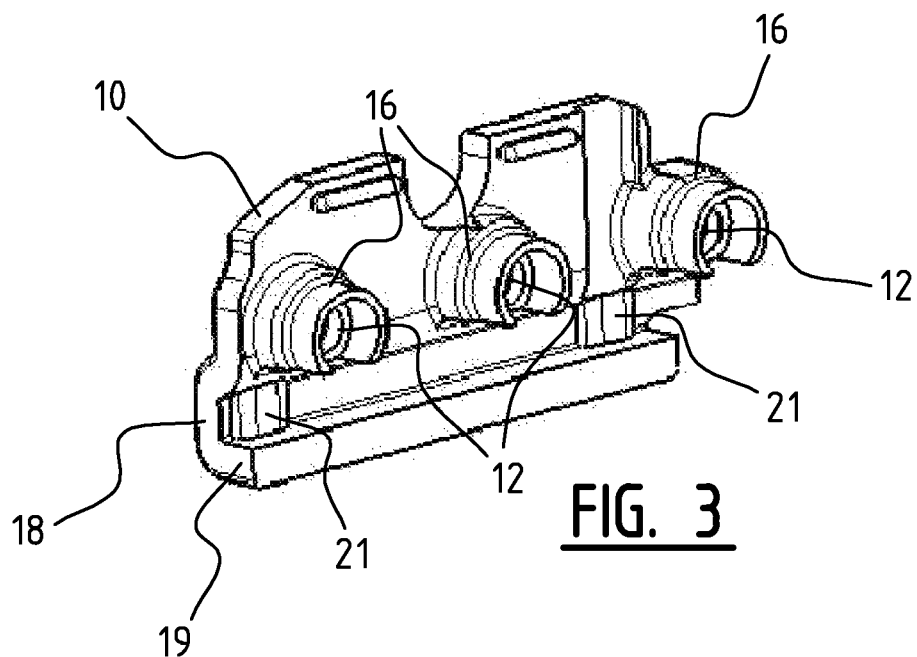
FIGS. 3 and 4 are a perspective view of two connecting parts of the connecting device of FIG. 2.
Figure 4:
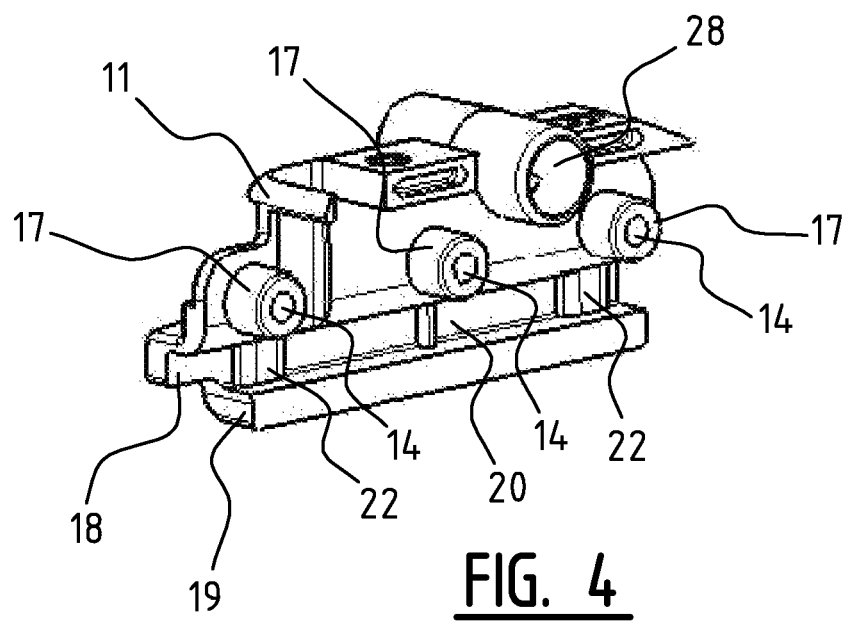

As shown in FIGS. 2, 3 and 4 the connecting device 6 comprises two connecting parts 10,11 formed as single constructional elements. When the connecting parts 10,11 are connected to each other, the spoiler 9 is sandwiched between the connecting parts 10,11 in the sense that the connecting parts 10,11 engage the spoiler 9 on opposite sides thereof the connecting parts 10,11 and the spoiler 9 are each provided with three co-axial transverse through holes 12,13,14 at the location of their interconnection, so that the connecting parts 10,11 and the spoiler 9 can be interconnected by means of three screws 15 having external screw thread and extending through the through holes 12,13,14. The through holes 14 of the connecting part 11 are provided with internal screw thread for that purpose. As shown in FIGS. 2 and 3, the connecting parts 10,11 are not mirror symmetrical with respect to a middle longitudinal plane of the connecting device 6, the plane extending perpendicular to a windscreen to be wiped. In assembled position, that is when the screws 15 are tightened, the connecting parts 10,11 exert a controllable, predetermined pressure on the spoiler 9. Thus, any lateral movement between the longitudinal strip and the wiper blade at the location of their interconnection and between the connecting device and the wiper blade at the location of their interconnection is blocked.

In use, during each oscillatory movement of the oscillatory arm 7, the wiper blade 2 at the location outside the connection device 6 would normally suffer from the so-called "fishtailing phenomenon", wherein the wiper blade 2 on opposite sides of the connecting device 6 vibrates in an uncontrollable manner parallel to a windscreen to be wiped. Obviously, this "fishtailing phenomenon" results in deteriorated wiping properties, with all negative consequences involved, particularly at high speeds. Hence, the longitudinal strip 4 is allowed to exhibit a curvature at the location of the interconnection of the connecting device 6 and the wiper blade 2. Experimental results have shown that the "fishtailing phenomenon" is now avoided according to the invention at least to a large extend.

With reference to FIGS. 3 and 4, the connecting parts 10,11 are provided with inwardly extending protrusions 16,17 comprising the through holes 12,14, wherein a protrusion 16 of the one connecting part 10 extends inside a protrusion 17 of the other connecting part 11 for guiding both connecting parts 10,11 into assembled position. Each connecting part 10,11 has legs 18 having a C-shaped cross-section, i.e. with inwardly bent edges 19 at their outer ends. In assembled position the legs 18 clamp around the wiper blade 2, so that the longitudinal strip 4 of the carrier element is situated in the C-shape. The legs 14 are each provided, on a respective vertical part 20 thereof, with two pairs of opposite protrusions 21,22 near the outer ends of the connecting parts 10,11. The protrusions 21,22 extend laterally inwardly for exerting only a transverse force on the rubber of the wiper blade 2, thereby locally squeezing the rubber onto the longitudinal strip 4.

Accordingly, any lateral movement of the longitudinal strip 4 at the location of the interconnection of the connecting device 6 and the wiper blade 2 is blocked. The protrusions 21,22 have the additional function to further limit the "fishtailing phenomenon".

Figure 5:
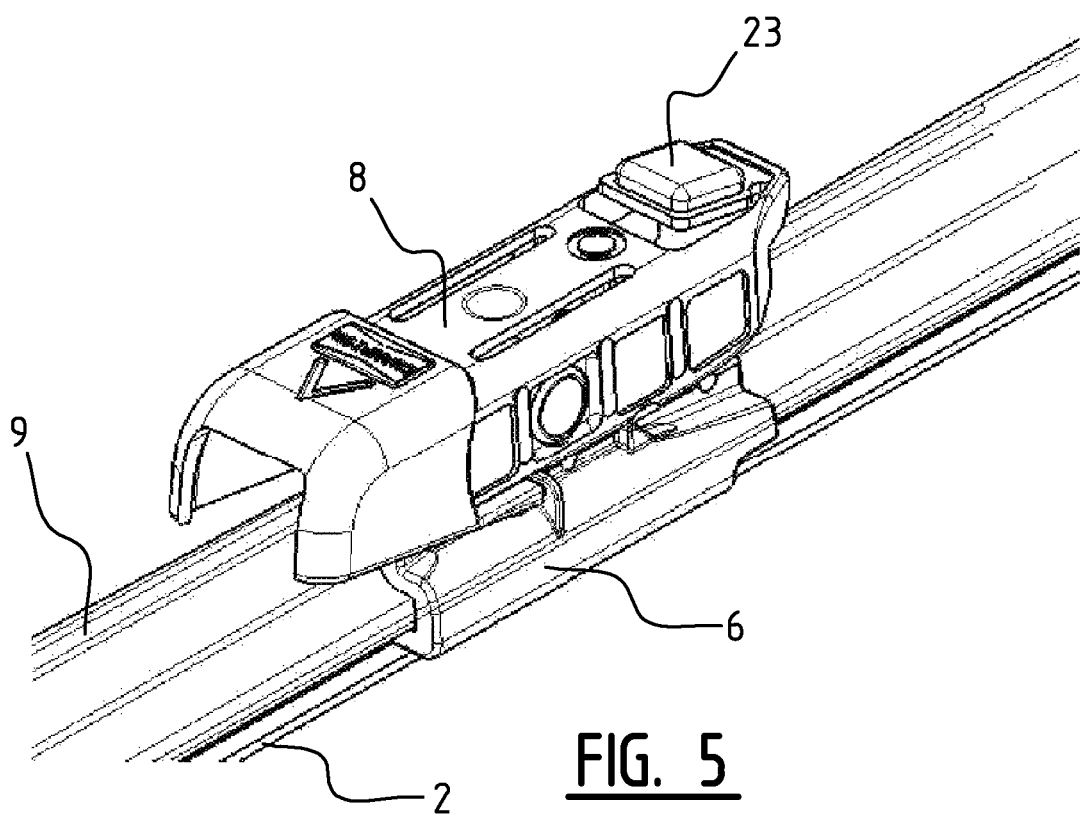
FIGS. 5 and 6 are details of a windscreen wiper device according to the invention showing a connection between the connecting device and the oscillating arm according to a first embodiment ("Bayonet connection") and to a second embodiment ("Sidelock connection"), respectively.

As can be seen in FIGS. 1 and 5, the joint part 8 comprises a resilient tongue 23 extending outwardly, while the oscillating arm 7 has an U-shaped cross-section at the location of its connection to the joint part 8, so that the tongue 23 engages in an identically shaped hole 24 provided in a base of the U-shaped cross-section. The connecting device 6 with the wiper blade 2 is mounted onto the oscillating arm 7 as follows. The joint part 8 being already clipped onto the connecting device 6 is pivoted relative to the connecting device 6, so that the joint part 8 can be easily slided on a free end of the oscillating arm 7. During this sliding movement the resilient tongue 23 is initially pushed in against a spring force and then allowed to spring back into the hole 24, thus snapping, that is clipping the resilient tongue 23 into the hole 24. This is a so-called bayonet-connection. The oscillating arm 7 together with the joint part 8 may then be pivoted back in a position parallel to the wiper blade 2 in order to be ready for use. By subsequently pushing in again the resilient tongue 23 against the spring force (as if it were a push button), the connecting device 6 and the joint part 8 together with the wiper blade 2 may be released from the oscillating arm 7. Dismounting the connecting device 6 with the wiper blade 2 from the oscillating arm 7 is thus realized by sliding the connecting device 6 and the joint part 8 together with the wiper blade 2 in a direction away from the oscillating arm 7.

Figure 6:
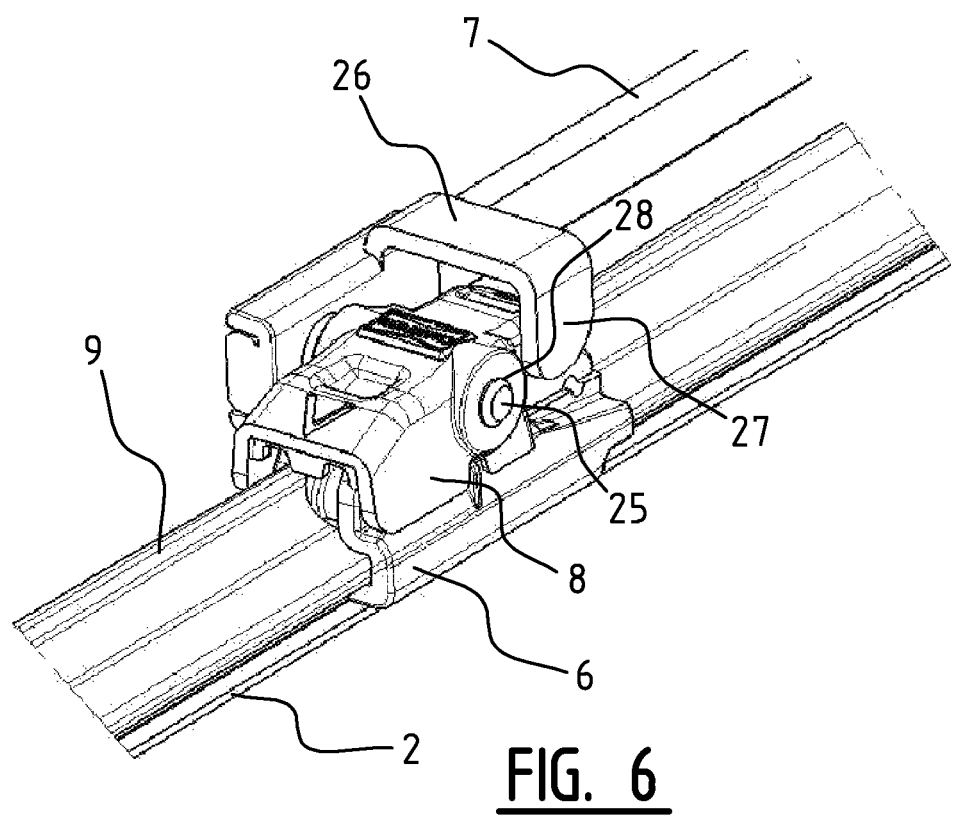

In the alternative as can be seen in FIG. 6, in a so-called "side-lock system", the oscillating arm 7 is provided with an extension comprising a pivot pin 25 being able to pivot around a pivot axis, as well as a L-shaped shoulder 26 acting as securing means for securing the connecting device 6 on the pivot pin 25. The L-shaped shoulder 26 projects out in the direction of the pivot pin 25 and across the wiper blade 2 and at the free end of which is disposed a leg 27 facing the windscreen to be wiped. The connecting device 6 comprises a joint part 8 with a transverse through hole 28 (see FIGS. 2 and 3) for receiving the pivot pin 25.

The invention is not restricted to the variants shown in the drawing, but it also extends to other preferred embodiments that fall within the scope of the appended claims.

The invention claimed is:

1. A windscreen wiper device comprising an elastic, elongated carrier element, as well as an elongated wiper blade of a flexible material, which can be placed in abutment with a windscreen to be wiped, which wiper blade is of the flat blade type and includes at least one groove, in which groove a longitudinal strip of the carrier element is disposed, wherein said windscreen wiper device further comprises a connecting device for detachably connecting said wiper blade to a wiper arm wherein said wiper blade comprises a spoiler at a side thereof facing away from a windscreen to be wiped, wherein said connecting device comprises connecting parts formed as separate constructional elements, wherein said spoiler is sandwiched between said connecting parts when they are connected to each other, thereby allowing said connecting parts to engage said spoiler on opposite sides thereof in order to block any lateral movement between said longitudinal strip and said wiper blade at the location of their interconnection and between said connecting device and said wiper blade at the location of their interconnection, wherein said connecting parts and said spoiler are provided with co-axial transverse through holes at the location of their interconnection, and wherein said connecting parts and said spoiler are connected together by means of a pin extending through said through holes.

2. The windscreen wiper device according to claim 1, wherein said connecting parts are assymmetrical with respect to a middle longitudinal plane of said connecting device.

3. The windscreen wiper device according to claim 1, wherein said pin is a screw.

4. The windscreen wiper device according to claim 1, wherein said connecting parts are provided with inwardly extending protrusions comprising said through holes, wherein a protrusion of the one connecting part extends inside a protrusion of the other connecting part.

5. The windscreen wiper device according claim 1, wherein the connecting parts comprise legs having inwardly bent edges at their outer ends, said legs being connected to the flexible material of said wiper blade on opposite sides thereof, wherein said legs are provided with two pairs of opposite protrusions near the outer ends of said connecting device, and wherein said protrusions extend laterally inwardly for exerting only a transverse force on the flexible material of said wiper blade, thereby locally squeezing said flexible material onto said longitudinal strip, in order to block any lateral movement between said longitudinal strip and said wiper blade at the location of their interconnection.

6. The windscreen wiper device according to claim 5, wherein the ratio (1/L) between the width L' of said flexible material at the location of said protrusions and the width L of said flexible material at the location outside said protrusions varies between 30% and 1%.

7. The windscreen wiper device according to claim 1, including an oscillating arm provided with an extension comprising a pivot pin pivoted about a pivot axis, as well as a L-shaped shoulder securing said connecting device on the pivot pin, wherein said L-shaped shoulder projects out in the direction of said pivot pin and across said wiper blade and at the free end of which is disposed a leg facing said windscreen to be wiped, and wherein said connecting device comprises a transverse through hole for receiving said pivot pin.

8. The windscreen wiper device according to claim 1 wherein said connecting device includes a joint part, and wherein said joint part is detachably connected to said connecting device by engaging protrusions of said connecting device, at the location of said pivot axis, in recesses provided in said joint part.

9. The windscreen wiper device according to claim 8, wherein the protrusions extend outwards on either side of said connecting device.

10. The windscreen wiper device according to claim 8, wherein said joint part comprises at least one resilient tongue engaging in a correspondingly shaped hole provided in a base of a U-shaped cross-section of an oscillating arm, and wherein said resilient tongue is rotatable along a hinge axis between an outward position for retaining said wiper blade onto an oscillating arm and an inward position releasing said wiper blade from the oscillating arm.

11. The windscreen wiper device according to claim 1, further a connecting piece positioned on both ends of said wiper blade and connected to an end of said longitudinal strip.

* * * * *